US008019125B2

(12) United States Patent
Nadreau et al.

(10) Patent No.: US 8,019,125 B2
(45) Date of Patent: Sep. 13, 2011

(54) SYSTEM AND METHOD FOR AUTOMATICALLY DETERMINING THE SEX OF CHICKS AND DEVICE FOR CONVEYING LIVING ANIMALS

(75) Inventors: Michael Nadreau, Landivisiau (FR); Jean-Claude Yvin, Plougoulm (FR); Patrick Le Moine, Morlaix (FR)

(73) Assignee: Egg-Chick Automated Technologies, Pace (FR)

( * ) Notice: Subject to any disclaimer, the term of this patent is extended or adjusted under 35 U.S.C. 154(b) by 819 days.

(21) Appl. No.: 12/103,781

(22) Filed: Apr. 16, 2008
(Under 37 CFR 1.47)

(65) Prior Publication Data

US 2009/0000915 A1 Jan. 1, 2009

Related U.S. Application Data

(60) Provisional application No. 60/912,304, filed on Apr. 17, 2007.

(51) Int. Cl.
*B65G 15/00* (2006.01)

(52) U.S. Cl. ......... 382/110; 119/845; 198/560; 198/701

(58) Field of Classification Search .................. 382/100, 382/110; 340/573.1, 573.3; 119/713, 843, 119/845; 198/373, 523, 560, 561, 701, 703, 198/704
See application file for complete search history.

(56) References Cited

U.S. PATENT DOCUMENTS

| 3,704,688 A | 12/1972 | Wilson | 119/22 |
| 5,626,101 A | 5/1997 | Kuhl | 119/845 |
| 6,396,938 B1 | 5/2002 | Tao et al. | 382/110 |
| 6,512,839 B1 | 1/2003 | Toelken | 382/110 |

FOREIGN PATENT DOCUMENTS

EP 1 092 347 A1 4/2001

*Primary Examiner* — Andrew W Johns
(74) *Attorney, Agent, or Firm* — Patterson Thuente Christensen Pedersen, P.A.

(57) ABSTRACT

A living animals conveying device for sorting animals with respect to a characteristic such as color, size, gender, or weight. In the case of chicks, an embodiment of the invention includes a section for conveying chicks with chicks positioned in buckets with their wings spread out, and an automatic chicks sexing system. A first endless bucket conveyor comprising pre-positioning buckets able to individually receive and transport a living animal, is oriented with respect to a second endless bucket conveyor, comprising sorting buckets able to individually receive and transport a living animal, the first conveyor and the second conveyor being arranged in such a way that each pre-positioned living animal in a pre-positioning bucket falls from the pre-positioning bucket into a sorting bucket arranged below the pre-positioning bucket.

20 Claims, 5 Drawing Sheets

SYSTEM AND METHOD FOR AUTOMATICALLY DETERMINING THE SEX OF CHICKS AND DEVICE FOR CONVEYING LIVING ANIMALS

RELATED APPLICATION

The present application claims the benefit of U.S. Provisional Application No. 60/912,304 filed Apr. 17, 2007, which is incorporated herein in its entirety by reference.

TECHNICAL FIELD

This invention relates to a device for conveying living animals, in particular chicks, and an automatic sexing system and method for chicks comprising such a conveying device.

BACKGROUND OF THE INVENTION

It is known, in particular via the patent document EP-1-092-347 entitled "Method of Automatic Sexing of Chicks," to determine the sex of chicks based on an examination of the cartilage of the feathers at the upper ends of the wings. In a first step of this method, the chick is conveyed in such a way that it loses its balance and that it automatically spreads out its wings via reflex. Photographs are taken of the spread wings, and the photographs are then analysed in order to deduce the sex of the chicks, with the chicks then being sorted according to sex. The '347 patent proposes several conveying devices making it possible to obtain this loss of balance of the chicks. In one of the proposed embodiments, the chicks are initially placed in the center of a carrousel, where they slide in the channels of the carrousel and fall into funnels that rest on the buckets of a bucket conveyor. The feet of each chick rest on the bottom of the bucket, and the bucket is descended downwards in relation to the funnel in such a way that the chick loses its balance and falls again with the wings spread out in the bucket, with its wings remaining spread out on an upper horizontal lip of the bucket. When the bucket descends, the chick is supported solely by its wings against the funnel and must fold its wings further upwards in order to fall back into the bucket, which can cause certain injuries to wings. Furthermore the chick can remain blocked in the funnel, with its wings pressing against the inclined wall of the funnel.

The '347 patent also proposes conveying devices, of the endless conveyor type, wherein the chicks are arranged one after one another, with the automatic spreading of the wings being obtained by vibration, oscillation or electrical discharge. However, these devices do not make it possible to guarantee exact spacing pitch between the chicks, which is needed for taking photographs.

SUMMARY OF THE INVENTION

The purpose of this invention is to propose a new conveying device that overcomes the aforementioned disadvantages.

To that effect, the invention includes a living animals conveying device, comprising, in one embodiment particular to the case of chicks, a section for conveying chicks wherein the chicks are positioned in buckets with their wings spread out, including a first endless bucket conveyor comprising pre-positioning buckets able to individually receive and transport a living animal between upstream return means and downstream return means, from an upstream loading zone to a downstream transfer zone, and a second endless bucket conveyor, comprising sorting buckets able to individually receive and transport a living animal between upstream return means and downstream return means, the first conveyor and the second conveyor being arranged in such a way that each living animal pre-positioned in a pre-positioning bucket falls from the pre-positioning bucket into a sorting bucket arranged below the pre-positioning bucket.

In certain embodiments of the invention, the conveying device makes it possible to cause the falling of each living animal from a pre-positioning bucket of the first conveyor into a sorting bucket of the second conveyor.

The pre-positioning buckets of the lower strand of the first conveyor are able to receive the living animals from above, the first conveyor comprising retaining means making it possible to retain the living animals in the buckets from a loading zone to a transfer zone at the level wherein the living animals fall by the open bottom of the buckets into the sorting buckets of the upper strand of the second conveyor, with the upstream return means of the second conveyor being arranged below the downstream return means of the first conveyor, with the second conveyor being for example arranged in the extension of the first conveyor.

According to an embodiment, the retaining means include an endless conveyor mounted between the upstream return means and downstream return means and of which the upper strand is arranged below the lower strand, in parallel to the latter, opposite the open lower ends of the sorting buckets of the lower strand and advance substantially in synchronism with the lower strand, in such a way that the living animals present in the sorting buckets come to press against the upper strand of the endless conveyor with their foot, the living animals falling from the pre-positioning buckets when the latter extend beyond the downstream return means of the endless conveyor.

According to an embodiment, the pre-positioning buckets are formed of hollow tubes mounted on rectangular plates arranged in parallel therein between one after another and assembled by their lateral ends between two synchronised parallel endless tracks.

The spacing pitch between two successive sorting buckets is higher than the spacing pitch between two successive pre-positioning buckets, with the forward speed of the sorting conveyor being higher than that of the pre-positioning conveyor.

The first conveyor comprises successive transversal rows of at least two pre-positioning buckets, the sorting conveyor comprising successive transversal rows of at least two sorting buckets.

The conveying device may include furthermore a loading system able to bring the living animals one after the other on pre-positioning buckets, in particular on each line of pre-positioning buckets.

This invention hereof also discloses an automatic chicks sexing system, including a conveying device such as defined previously, each sorting bucket comprising a lip, more preferably inclined, whereon are intended to rest the spread out wings of the chicks falling from the pre-positioning buckets, and image acquisition means able to obtain a photograph of at least one of the wings of each chick present in a sorting bucket in order to determine the sex thereof.

The lip of sorting buckets is extended at the top by an inclined guiding wall. According to an embodiment, each sorting bucket is provided with a trapdoor provided with opening/closing means, the sorting conveyor being provided with activating means for activating the opening/closing means for the ejection via the bottom of the chick towards different means of recovery, for example of the conveyor with endless belt type, according to the result of the image processing. The sexing system can furthermore include blowing systems arranged above the upper strand of the sorting conveyor, able to blow air in the direction of each sorting bucket when its trapdoor opens.

The invention will be better understood, and other purposes, details, characteristics and advantages will appear more clearly during the detailed explanatory description that follows of a specially preferred embodiment of the invention, in reference to the annexed schematic drawing.

DETAILED DESCRIPTION OF THE DRAWINGS

Figure 1:
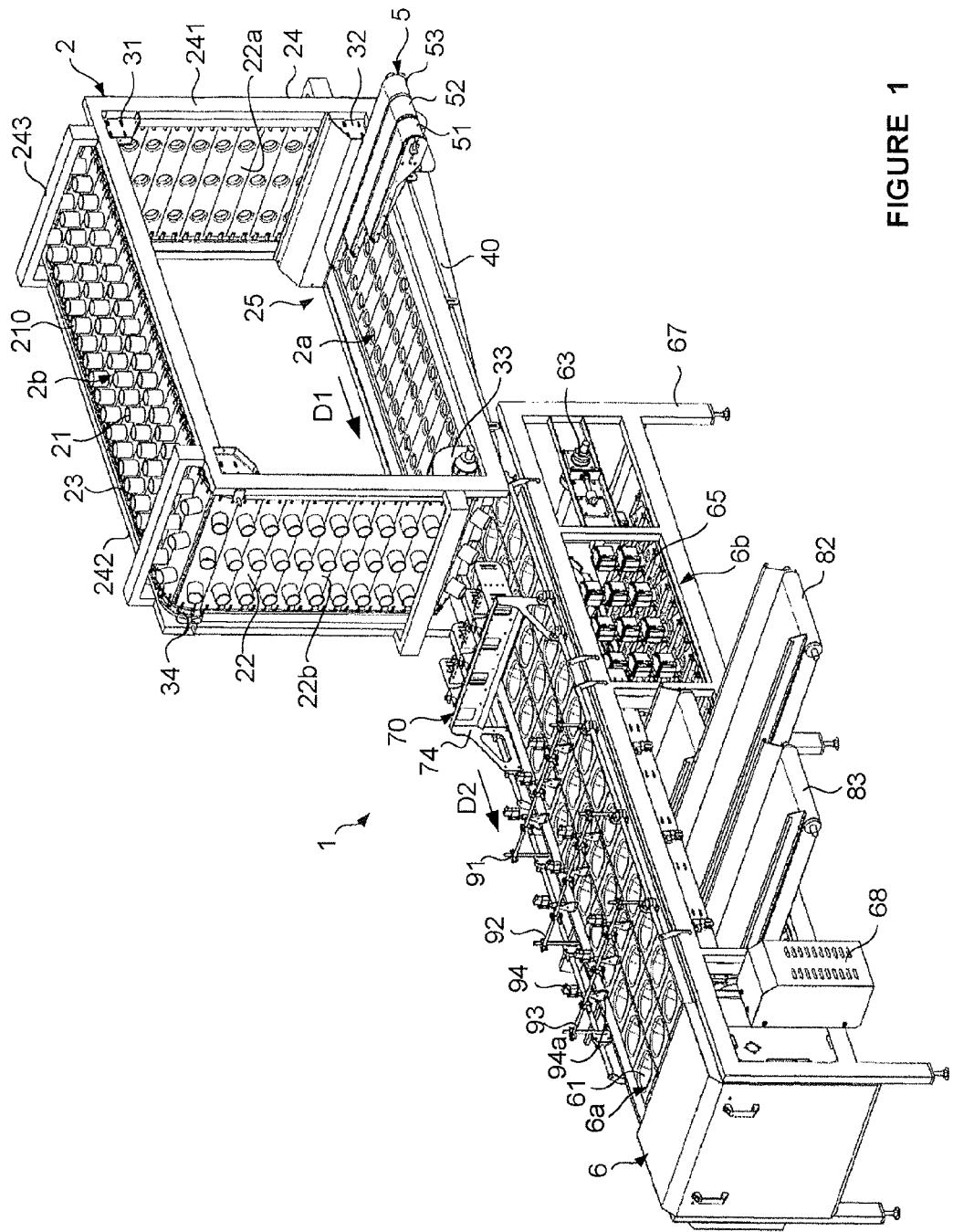
FIGS. 1 and 2 are perspective views depicting an automatic sexing system for chicks in accordance with an embodiment of the invention.
Figure 2:
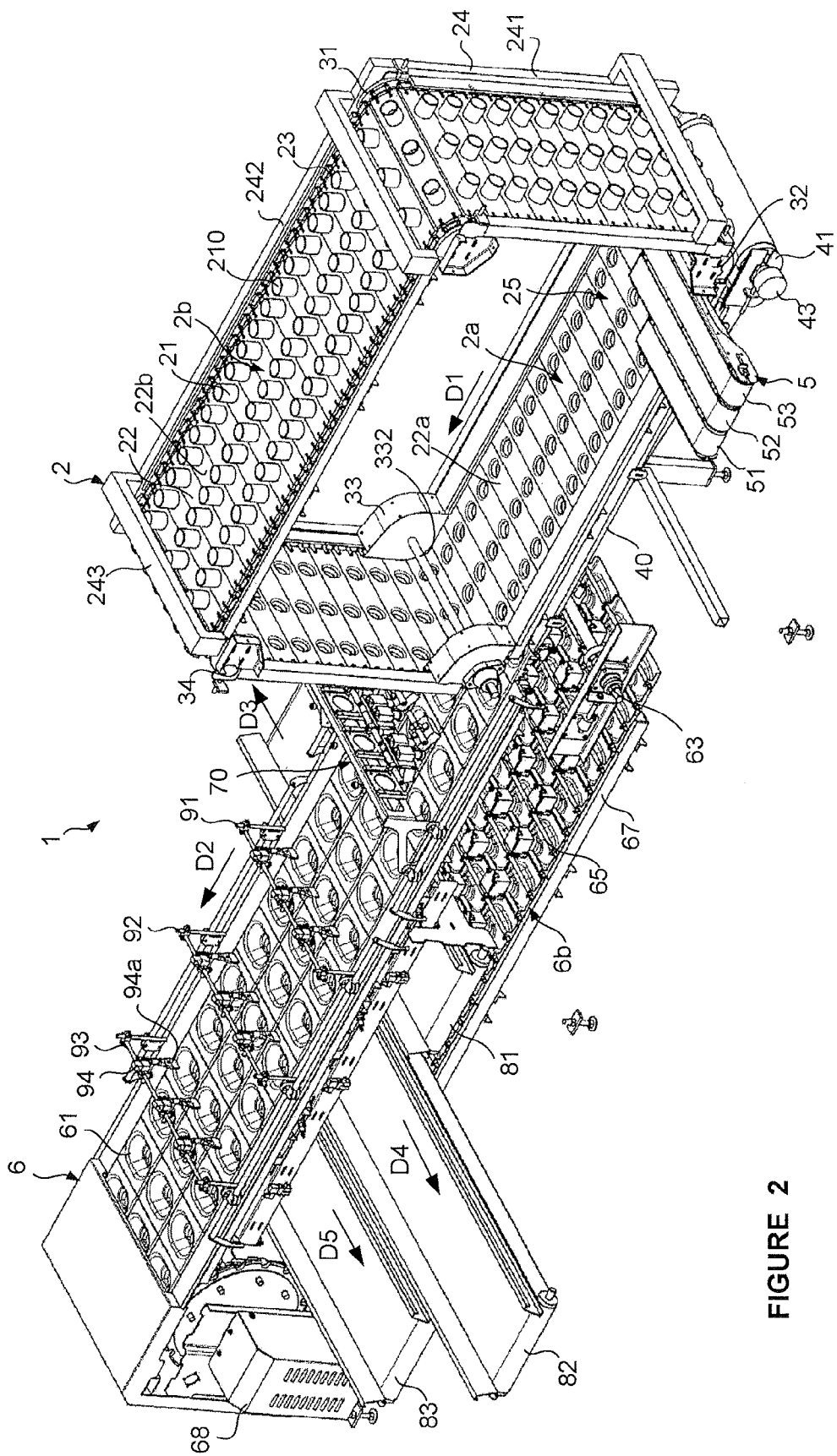
Figure 3:
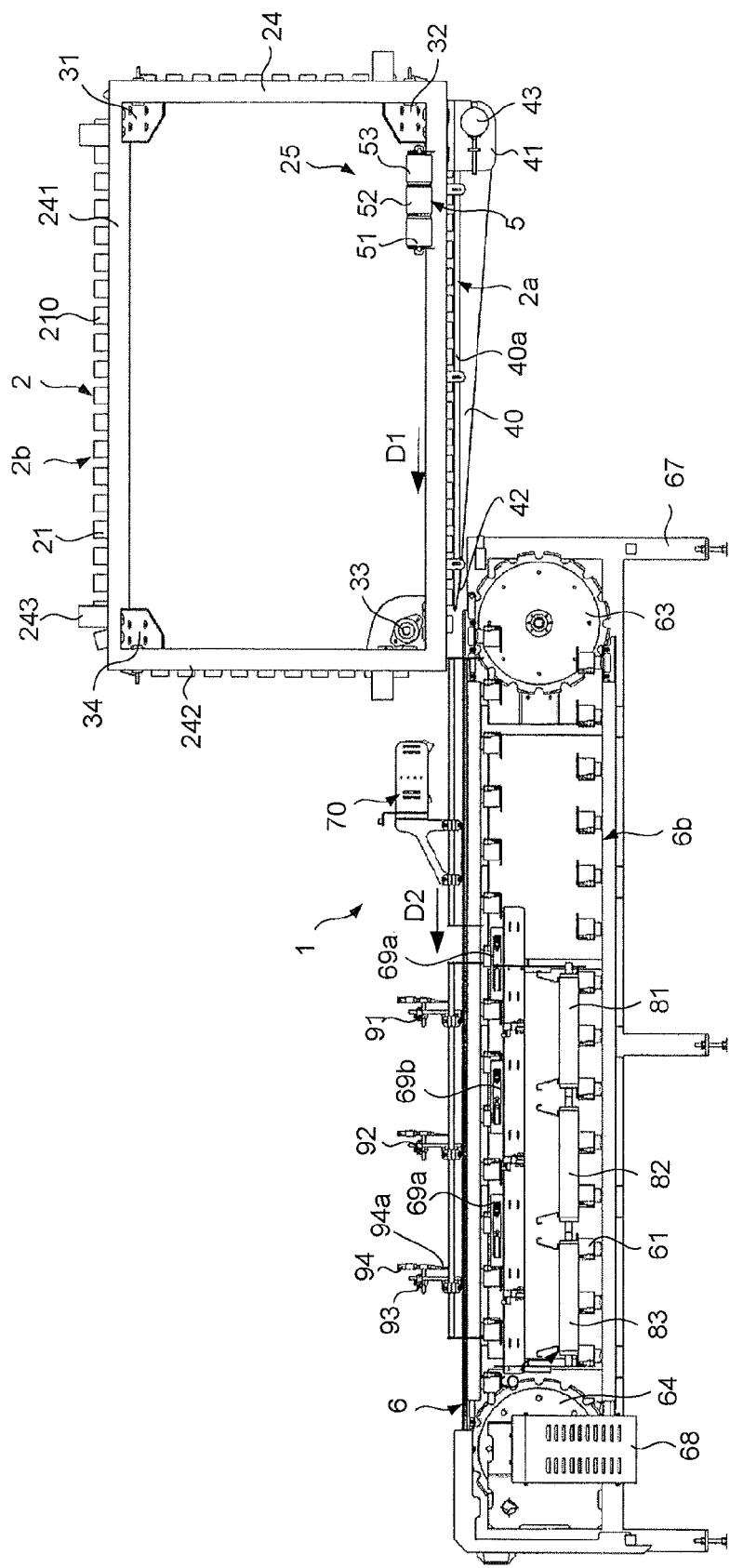
FIG. 3 is a side view of the automatic sexing device of FIGS. 1 and 2.

With reference to FIGS. 1-3, an automatic sexing device includes a chicks conveying device 1 which comprises a first endless bucket conveyor 2, referred to as pre-positioning conveyor, and a second endless bucket conveyor 6, referred to as sorting conveyor, with these conveyors being conformed and arranged in relation to one another in such a way that the chicks pre-positioned in the buckets of pre-positioning conveyor 2 fall into the buckets of sorting conveyor 6, with the chicks positioning themselves in the sorting buckets with their wings maintained spread out.

Pre-positioning conveyor 2 comprises pre-positioning buckets 21 mounted in a loop, one after the other, around upper upstream return assembly 31 and lower upstream return assembly 32, and lower downstream return assembly 33 and upper downstream return assembly 34. The transport of the chicks is carried out in buckets 21 of lower strand 2a of conveyor 2 defined between lower upstream return assembly 32 and downstream lower return assembly 33, between an upstream loading zone 25 and a downstream transfer zone 26 defined hereinafter. One or several buckets 21, each formed of a hollow tube of circular section 210, is mounted on a rectangular plate 22. Plates 22 are assembled in parallel to one another by their ends to the chain links of two endless parallel tracks 23 that mesh on pairs of toothed gearwheels 331 (FIG. 5), each pair of toothed gearwheels 331 constituting a return assembly defined previously. The wheels of each pair of toothed gearwheels 331 are attached to an axis 332 mounted mobile in rotation on a support frame 24. Support frame 24 comprises two lateral rectangular frames 241, 242 connected in parallel between thereof by crosspieces 243. Axes 332 of the pairs of the upper upstream wheels are mounted between frames 241 and 242, at the four corners of the latter. Support frame 24 rests on the floor via feet (not shown), in such a way that lower strand 2a is arranged substantially horizontally. The spacing between upper return assemblies 31, 34 and lower return assemblies 32, 33 is determined in order to obtain a space between upper strand 2b and lower strand 2a that is large enough to allow for the loading and the transport of the chicks in pre-positioning buckets 21 of lower strand 2a, as well as the possible intervention of an operator, in ergonomic conditions, to place chicks in buckets 21.

The advancing of lower strand 2a of pre-positioning conveyor 2 in the forward direction shown by the arrow referenced as D1, is provided using at least one motor able to drive in rotation axis 332 of wheels 331 forming lower upstream return assembly 32 and/or lower downstream return assembly 33.

In the example shown in the figures, each plate 22 carries three buckets 21 arranged side by side, transversally to the forward direction D1, pre-positioning conveyor 2 comprising as such three parallel lines of buckets 21. Tubes 210 forming buckets 21 are assembled perpendicularly to plates 22 in openings extending therethrough, in such a way that the open upper end of tubes 210 is substantially flush with inner face 22b of plates 22. Tubes 210 are projecting towards the exterior, with outer opened end 21a thereof at a distance from outer face 22a of plates 22.

Pre-positioning conveyor 2 is provided with an endless conveyor 40 arranged below pre-positioning conveyor 2 in order to make it possible to retain the chicks in buckets 21 of lower strand 2a. As better shown in FIG. 5, upper strand 40a of endless conveyor 40 is arranged in parallel to lower strand 2a, opposite outer ends 21a of buckets 21, also called lower ends. Endless conveyor 40 is mounted between an upstream return roller 41, arranged substantially on lower upstream return assembly 32, and a return blade 42. Upstream return roller 41 is driven in rotation by a motor 43, in such a way that upper strand 40a of endless conveyor 40 advances substantially as isospeed with lower strand 2a, in the forward direction D1. The end of downstream return blade 42 is arranged upstream of lower downstream return assembly 33 of pre-positioning conveyor 2, in such a way that lower strand 2a of first conveyor 2 comprises at least one row of three buckets 21 of a same plate 22 that are not arranged across from upper strand 40a of endless conveyor 40. Each plate 22 advances substantially horizontally beyond the end of return blade 42 before rolling onto lower downstream return assembly 33. When a pre-positioning bucket 21 arrives on transfer zone 26 defined beyond return blade 42, the chick contained in pre-positioning bucket 21 falls downwards by gravity.

Pre-positioning conveyor 2 is furthermore provided with a loading system 5 comprising three loading conveyors 51, 52, and 53 of the endless conveyor type in order to allow for the loading of chicks into buckets 21 of each line. Loading conveyors 51, 52, and 53, shown schematically in the figures, are arranged perpendicularly to pre-positioning conveyor 2, and in parallel in relation to one another, and are intended to receive on the upper strand thereof the chicks one after another. The downstream return wheels of loading conveyors 51, 52, and 53 are arranged above lower strand 2a, on loading zone 25, and are shifted transversally in relation to the forward direction D1, in such a way that a downstream end of each loading conveyor 51, 52, and 53 is arranged in the perpendicularity of each line of buckets 21. Loading conveyors 51, 52, and 53 are provided with lateral guiding edges (not shown) in order to retain the chicks on the upper strand thereof.

Figure 4:
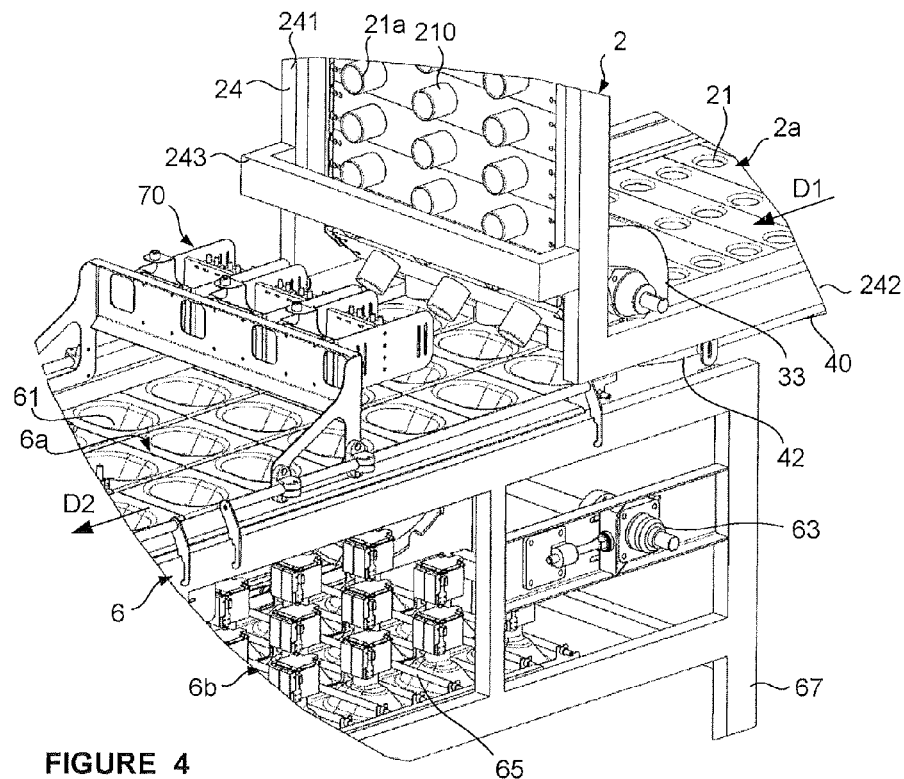
FIGS. 4 and 5 are, respectively, partially enlarged views of FIGS. 1 and 3, depicting the transfer zone of the chicks from the first bucket conveyor to the second bucket conveyor.
Figure 5:
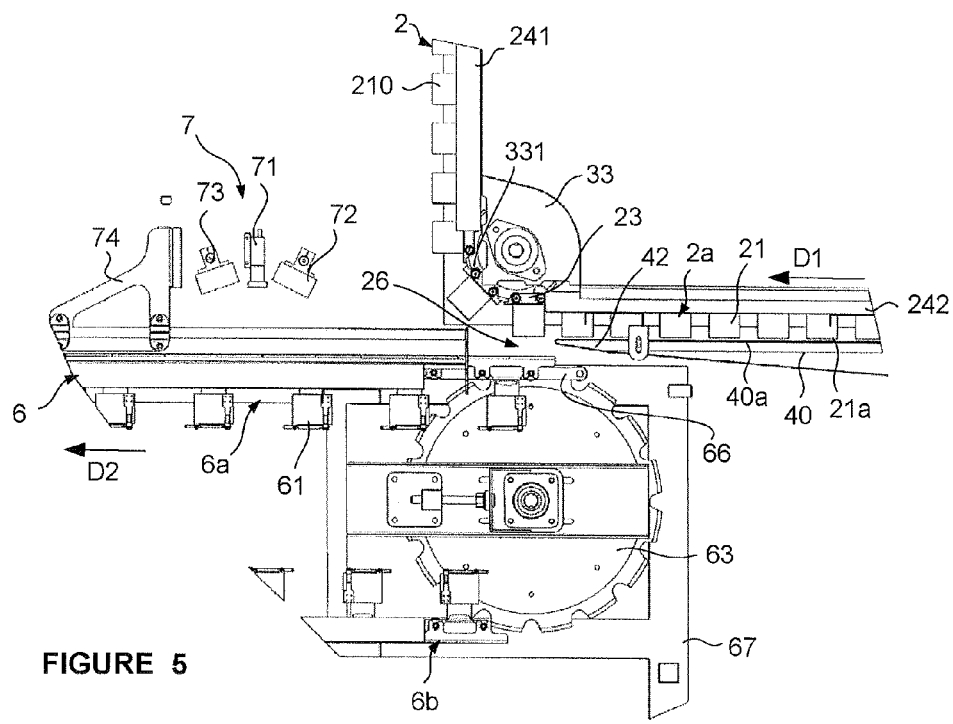

Sorting conveyor 6 is arranged in the extension of pre-positioning conveyor 2 and comprises successive rows of three sorting buckets 61 mounted in a loop around an upstream return assembly 63 and a downstream return assembly 64. With reference to FIGS. 4 and 5, upper strand 6a is arranged substantially horizontally below lower strand 2a of pre-positioning conveyor 2, in such a way that a row of sorting buckets 61 is arranged substantially opposite a row of pre-positioning buckets 21 moving beyond the end of return blade 42.

Figure 6A:
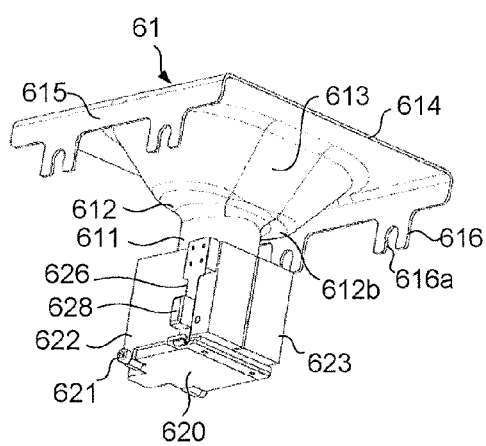
FIGS. 6A and 6B are perspective views depicting a bucket of the second bucket conveyor, with the trapdoor therein in closed position.
Figure 6B:
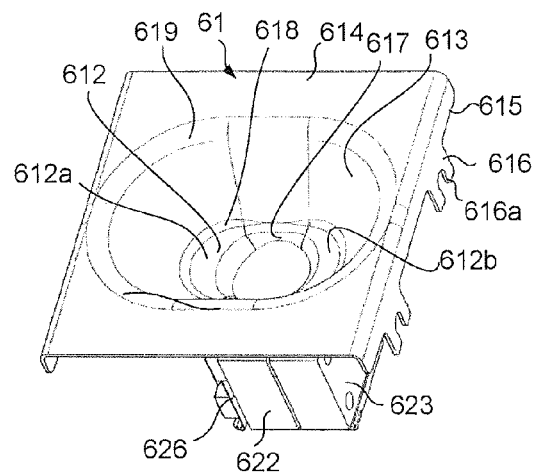
Figure 7A:
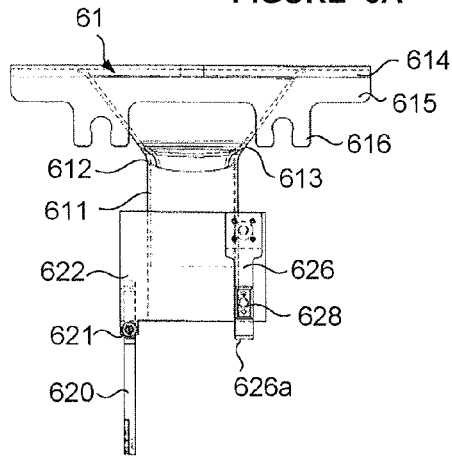
FIGS. 7A and 7B are side views depicting the bucket shown in FIGS. 6A and 6B, with the trapdoor therein in open position.
Figure 7B:
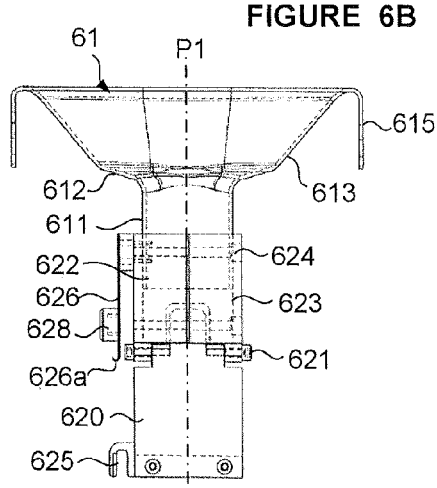

According to FIGS. 6A-B and 7A-B, each sorting bucket 61 is formed of a receptacle in the shape of a funnel comprising a lower tubular portion 611 that is extended at the top by an intermediary portion 612 of substantially oval transversal section, defining two slightly inclined intermediary lips 612*a*, 612*b*, diametrically opposite, on either side of the symmetry plane P1 (FIG. 7B), and an upper portion 613 having a substantially oval cross section defining an inclined guiding wall in order to guide the chicks towards lower tubular portion 611. Upper portion 613 presents an upper horizontal rectangular edge 614 comprising two opposite lips 615 on either side of plane P1, extending perpendicularly towards the bottom, each lip being provided with two mounting flanges 616 with notch 616*a*. The different portions 611, 612, and 613 of the receptacle, and horizontal upper edge 614, are connected in relation to one another by angled joining zones 617, 618, and 619 (FIG. 6B). The receptacle therefore does not include any edge likely to hurt the chick when it falls into the receptacle.

Sorting buckets 61 are mounted on parallel transversal rods 65 assembled by the ends thereof on the chain links of parallel endless tracks 66 (FIG. 5), with synchronous displacement, with the chains being mounted in a loop on upstream and downstream toothed return gearwheels, constituting the aforementioned return assemblies 63, 64. The pairs of gearwheels are each attached to an axis mounted mobile in rotation on a carrier frame 67, with at least one of the pairs of gearwheels being driven in rotation by a motor 68, in such a way that upper strand 6*a* is driven in the forward direction shown by the arrow referenced as D2. The assembly of each sorting bucket 61 is carried out by the latching of two adjacent rods 65 in notches 616*a* of mounting flanges 616, the symmetry plane P1 of buckets 61 arranged in parallel to the forward direction D2, the widest dimension of intermediary portion 612 and upper portion 613 with oval cross-section arranged perpendicularly to the forward direction D2. Once assembled on transversal rods 65, sorting buckets 61 of a same row and of a same line are arranged edge-to-edge.

Referring to FIGS. 6A, 6B, 7A, and 7B, each bucket 61 comprises a trapdoor 620 formed of a plate mounted to pivot around an axis 621 which is assembled between two fixing semi-clamps 622, 623 clamped using screws 624 on the tubular portion 611. Pivoting axis 621 of trapdoor 620 is arranged perpendicularly to the forward direction D2. An elastic blade 626 extending from the bottom to the top is fixed via one end on one of the faces of a semi-clamp 622 or 623 parallel to the forward direction and has one lower free end 626*a*, curved outwards, able to latch at rest with a lateral flange 625 of trapdoor 620 in order to maintain trapdoor 620 in a closed position. Blade 626 has on the outer face thereof an actuation rivet 628 on which pressure can be exercised in order to unlatch curved end 626*a* from flange 625 of trapdoor 620 and thus allow the opening of trapdoor 620.

The automatic sexing device comprises one or more image acquisition assemblies 70 arranged downstream of the transfer zone above upper strand 6*a* of second conveyor. These assemblies 70 comprises a digital camera 71 arranged above each line of sorting buckets 61. In one embodiment of the invention, three digital cameras 71 are mounted on a support ramp 74 arranged transversally above sorting conveyor 6 on the downstream portion thereof, and fixed to frame 67. Each camera 71 is able to take a photograph of the wings of each chick arranged in successive buckets 61 of a line. Light sources are mounted on ramp 74 in order to illuminate the wings of the chicks at the moment when photographs are taken. Two light sources 72, 73 are for example arranged on either side of camera 71, one light source 72 upstream, and the other light source 73 downstream of camera 71. In one embodiment of the invention, light sources 72 and 73 are of the blue LED type, in order to accentuate the difference between the cartilage in relation to down. Cameras 71 are connected to a control unit (not shown) that processes the images taken by cameras 71 in order to determine the sex of the chicks.

Figure 8:
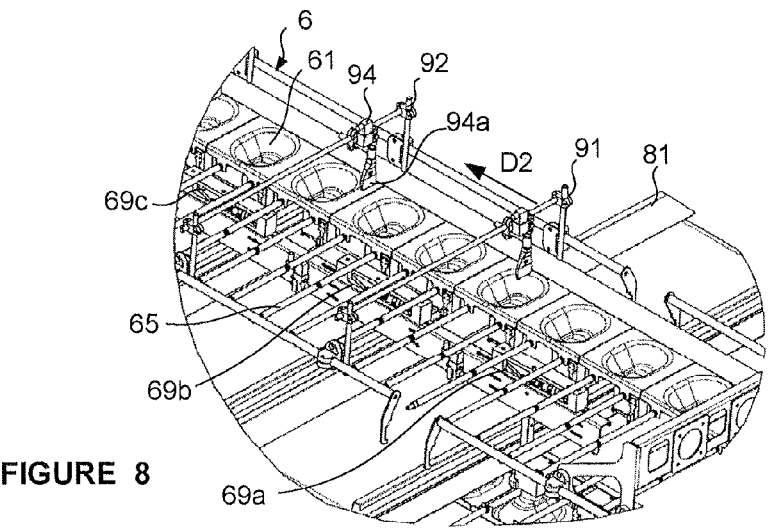
FIG. 8 is a partial enlargement of FIG. 2, depicting the ejection zones of the chicks from the second bucket conveyor.

The spacing pitch between two successive sorting buckets 61 of a same line is sufficient to allow the photographs to be taken. This spacing pitch is higher than the spacing pitch of two successive pre-positioning buckets 21 of a same line of pre-positioning conveyor 2, with the forward speed of pre-positioning conveyor 2 being less than that of sorting conveyor 6. Pre-positioning conveyor 2 can therefore operate at a speed that is reduced enough to allow an operator to manually place in buckets 21 the chicks arriving from loading conveyors 51, 52, and 53. By way of example, the spacing pitch between sorting buckets 61 is twice that of pre-positioning buckets 21, with the forward speed of sorting conveyor 6 being substantially two times higher than that of pre-positioning conveyor 2. The motors of sorting conveyor 6 and of pre-positioning conveyor 2 are controlled by the control unit. According to an alternative embodiment, sorting conveyor 6 is driven by the motor 68 such as described hereinabove, and pre-positioning conveyor 2 is driven by sorting conveyor 6 via a mechanical synchronisation, such as a transmission chain or a toothed belt connecting for example the axes of upstream return assembly 63 and lower downstream return assembly 33. As depicted in FIG. 8, the sexing device further comprises one or more activating assemblies 69, connected to the control unit, and arranged downstream of cameras 71, below upper strand 6*a* of pre-positioning conveyor 2 in order to activate trapdoors 620 of buckets 61 in order to evacuate the chicks downwards. Each activating assembly 69 comprises a control piston able to displace a cam between a rest position wherein the cam is at a distance from rivets 628 of blades 626 of buckets 61 of a line, and an active position wherein rivet 628 of a bucket 61 comes to press against the cam in such a way as to displace blade 626 and thus release curved end 626*a* from flange 625 of trapdoor 620 in order to allow for the opening of the latter. In one embodiment, the device comprises three sets of three activating assemblies 69. Three activating assemblies 69 of each set are arranged transversally side-by-side in order to each actuate trapdoors 620 of sorting buckets 61 of a same line, with the three sets being shifted along the transport path of sorting conveyor 6. An activating assembly of each set is depicted under references 69*a*, 69*b* and 69*c* in FIG. 8.

Referring to FIG. 2, the sexing device comprises from upstream to downstream first, second and third recovery endless conveyors, respectively 81, 82 and 83, arranged substantially transversally to sorting conveyor 6, between upper strand 6*a* therein and lower strand 6*b* therein. Each recovery conveyor 81, 82, and 83 is associated with a set of activating assemblies in order to recover on the upper strand thereof the chicks falling from sorting buckets 61. By way of example, the chicks of which the sex was not able to be determined subsequent to image processing by the control unit will be transferred onto first recovery conveyor 81, to be redirected subsequently to pre-positioning conveyor 2 for processing again. Chicks identified as males and those identified as females will be transferred respectively onto second recovery conveyor 82 and third recovery conveyor 83. Recovery conveyers 81, 82, and 83 operate continuously or discontinuously, under the control of the control unit, with first recovery conveyor 81 evacuating the chicks to the right of sorting conveyor 6 in relation to the forward direction D2, while second recovery conveyor 82 and third recovery conveyor 83 evacuate the chicks towards the left. The arrows referenced as D3, D4 and D5 in FIG. 2 show respectively the forward directions of the upper strands of first, second and third recovery conveyers 81, 82, and 83.

In order to provide for the evacuation of the chicks out of sorting buckets 61 when trapdoors 620 are opened, the sexing device comprises three ramps 91, 92, 93 arranged transversally above upper strand 6a of sorting conveyor 6, each bearing three blowing systems 94, each blowing system 94 being able to blow air downwards via a nozzle 94a directed towards sorting buckets 61 of a line. A ramp is arranged at the level of each recovery conveyor.

A description of the operation according to an embodiment of the invention will now be carried out. The chicks are brought one after another on lower strand 2a of pre-positioning conveyor 2, on loading zone 25, and the chicks fall into buckets 21 of the three lines streaming in the forward direction D1. Any chicks falling onto plates 22 are manually positioned by one or several operators in empty pre-positioning buckets 21. Each chick placed in a bucket 21 has its feet pressing on upper strand 40a of endless conveyor 40 streaming substantially at the same speed as pre-positioning conveyor 2. The spacing between open lower end 21a of the pre-positioning buckets 21 and upper strand 40a of endless conveyor 40 makes it possible to prevent a blocking of the feet in the event of a possible difference between the linear speed of lower strand 2a of pre-positioning conveyor 2 and the linear speed of upper strand 40a of endless conveyor 40. The depth of pre-positioning buckets 21 is determined in such a way that the chick cannot escape from it.

When a row of pre-positioning buckets 21 arrives beyond the end of downstream return blade 42, on transfer zone 26, the chicks fall through open lower end 21a of pre-positioning buckets 21 in the row of empty sorting buckets 61 arranged opposite. As soon as the chicks lose contact with endless conveyor 40, they instinctively spread out their wings. When a chick falls into a sorting bucket 61, the inclined guiding wall of upper portion 613 guides the chick with its wings spread out towards the bottom of sorting bucket 61 in lower tubular portion 611. The chick is pressing with the ends of its feet against the plate forming trapdoor 620, and its spread out wings rest on intermediary lips 612a and 612b. In one embodiment of the invention, the inclined wall of upper portion 613 has an angle of inclination between about 60 degrees and about 30 degrees in relation to the horizontal, and more particularly, for example, of about 45 degrees. The slight inclination of intermediary lips 612a and 612b makes it possible to prevent the chick from taking support from these latter with its wings in order to leave the receptacle. In an embodiment of the invention, the angle of inclination for intermediary lips 612a and 612b is between about 5 degrees and about 10 degrees in relation to the horizontal, and more particularly of about 10 degrees.

The rows of buckets 61 advance successively under cameras 71. Three cameras 71 simultaneously take a photograph of the wings of the chicks arranged in three buckets 61 of each row. The photographs are recovered and processed by the control unit in order to determine the sex of the chicks contained in sorting buckets 61. For each bucket 61 of a line, the control unit controls the displacement of one of the three pistons of activating assembly 69 corresponding to the line, in order to evacuate the chick either onto first recovery conveyor 81 when the processing of the photograph has failed to determine the sex of the chick, onto second recovery conveyor 82 when the chick has been identified as a male, or onto third recovery conveyor 83 when the chick has been identified as a female. During the actuation of one of the pistons to open trapdoor 620 of a bucket 61, the control unit controls nozzle 94a of blowing system 94 arranged above bucket 61 to blow air in the direction of the bottom of bucket 61. Sorting buckets 61 advancing beyond the third set of activating assemblies 69 have trapdoor 620 thereof in open position, with trapdoors 620 closing automatically, possibly by simple gravity, during the winding of buckets 61 around downstream return assembly 64.

In an alternative embodiment, by replacing endless conveyor 40 making it possible to retain the chicks in pre-position buckets 21 of lower strand 2a, pre-positioning conveyor 2 comprises pre-positioning buckets 21 provided with trapdoors, with activating assemblies then being provided to allow for the simultaneous opening of the trapdoors of the three buckets of a same row, when the latter is arranged opposite a row of sorting buckets 61 of the second sorting conveyor 6.

The conveying device according to the invention can be used to carry out the sorting of different living animals, in particular poultry, according to their sex, or according to another criterion such as their color, size and/or weight.

Although the invention has been described with reference to the particular embodiments described herein, the invention is not limited to the particular embodiments hereof.

The invention claimed is:

1. A living animal conveying device for conveying living animals, the conveying device comprising:
   a first endless bucket conveyor comprising a plurality of pre-positioning buckets adapted to individually receive and transport a living animal between a first upstream return assembly and a first downstream return assembly; and
   a second endless bucket conveyor comprising a plurality of sorting buckets adapted to individually receive and transport a living animal between a second upstream return assembly and a second downstream return assembly,
   wherein the first endless bucket conveyor and the second endless bucket conveyor are oriented with respect to each other such that each living animal positioned in a pre-positioning bucket falls from the pre-positioning bucket into a sorting bucket positioned below the pre-positioning bucket.

2. The living animal conveying device according to claim 1, wherein the pre-positioning buckets of a lower strand of the first endless bucket conveyor are adapted to receive the living animals from a position above the lower strand, wherein the first endless bucket conveyor further comprises a retaining assembly adapted to individually retain a living animal within a pre-positioning bucket while the living animal is conveyed from a loading zone to a transfer zone, and wherein the living animal falls from an open bottom of a pre-positioning bucket into a sorting bucket of an upper strand of the second endless bucket conveyor.

3. The living animal conveying device according to claim 2, wherein the retaining assembly comprises an endless conveyor mounted between the first upstream return assembly and the first downstream return assembly, and wherein the upper strand of the endless conveyor is positioned below and in parallel to the lower strand of the first endless bucket conveyor, and opposite the open lower end of the pre-positioning buckets of the lower strand, and wherein the upper strand of the endless conveyor advances substantially in synchronism with the lower strand of the first endless bucket conveyor.

4. The living animal conveying device according to claim 3, wherein at least some pre-positioning buckets of the plurality of pre-positioning buckets comprise a hollow tube mounted on a rectangular plate, wherein each of the rectangular plates are positioned in parallel to each other, and assembled by lateral ends of each rectangular plate between two synchronised parallel endless tracks.

5. The living animal conveying device according to claim 1, wherein a first spacing pitch between two successive sorting buckets of the plurality of sorting buckets is greater than a second spacing pitch between two successive pre-positioning buckets of the plurality of pre-positioning buckets, and wherein a forward speed of the second endless bucket conveyor is greater than a forward speed of the first endless bucket conveyor.

6. The living animal conveying device according to claim 1, wherein the first endless bucket conveyor comprises successive transversal rows of at least two pre-positioning buckets, and the second endless bucket conveyor comprises successive transversal rows of at least two sorting buckets.

7. The living animal conveying device according to claim 1, further comprising a loading system adapted to individually load the living animals into the plurality of pre-positioning buckets.

8. The living animal conveying device according to claim 1, wherein the living animals comprise chicks, and wherein the chicks are positioned with their wings spread out at least while the chicks are falling from the pre-positioning buckets into the sorting buckets, and while the chicks are individually positioned within the sorting buckets.

9. An automatic chicks sexing system comprising a conveying device according claim 8, wherein each sorting bucket comprises an inclined lip such that the spread out wings of the chicks falling from the pre-positioning buckets rest on the inclined lip, and wherein the automatic chicks sexing system further comprises an image acquisition assembly adapted to obtain a photograph of at least one of the wings of each chick present in a sorting bucket for imaging processing to determine the sex thereof.

10. The automatic sexing system for chicks according to claim 9, wherein the lip extends from a top of a sorting bucket by an inclined guiding wall.

11. The automatic sexing system for chicks according to claim 9, wherein each sorting bucket of at least some of the plurality of sorting buckets comprises a trapdoor and an opening/closing assembly for the trapdoor, and wherein the second endless bucket conveyor further comprising an activating assembly adapted to activate the opening/closing assembly of each trapdoor such that an ejection of the chick from the sorting bucket is accomplished through the trapdoor, and wherein the ejection of the chick towards one of a plurality of recovery assemblies is based on a result of the image processing.

12. A method of automatically determining a sex of chicks, the method comprising:
loading the chicks onto a first endless bucket conveyor comprising a plurality of pre-positioning buckets, wherein the chicks are individually loaded from a loading assembly into a pre-positioning bucket;
conveying each chick positioned within a pre-positioning bucket between a first upstream return assembly and a first downstream return assembly;
transferring the chicks onto a second endless bucket conveyor comprising a plurality of sorting buckets from the first endless bucket conveyor, wherein the first endless bucket conveyor and the second endless bucket conveyor are oriented with respect to each other such that each chick positioned in a pre-positioning bucket falls from the pre-positioning bucket into a sorting bucket positioned below the pre-positioning bucket such that wings of each chick spread out during the fall;
retaining the chicks having spread out wings within the sorting buckets;
advancing the chicks in the sorting buckets from a second upstream assembly to an image acquisition assembly comprising a camera; and
obtaining a photograph of at least one of the wings of each chick present in a sorting bucket for imaging processing to determine the sex thereof.

13. The method of claim 12, further comprising:
conveying the chicks from the image acquisition assembly to a plurality of recovery assemblies,
ejecting each chick onto one of the plurality of recovery assemblies based on a result of the image processing, wherein ejection is accomplished via a trapdoor positioned on each sorting bucket of at least some of the plurality of sorting buckets, wherein the trapdoor includes an opening/closing assembly, and wherein the second endless bucket conveyor further comprises an activating assembly adapted to activate the opening/closing assembly of each trapdoor.

14. A living animal conveying device for conveying living animals, the conveying device comprising:
a first endless bucket conveyor comprising a plurality of pre-positioning buckets adapted to individually receive and transport a living animal between first upstream return means and first downstream return means; and
a second endless bucket conveyor comprising a plurality of sorting buckets adapted to individually receive and transport a living animal between second upstream return means and a second downstream return means,
wherein the first endless bucket conveyor and the second endless bucket conveyor are oriented with respect to each other such that each living animal pre-positioned in a pre-positioning bucket falls from the pre-positioning bucket into a sorting bucket positioned below the pre-positioning bucket.

15. The living animal conveying device according to claim 14, wherein the pre-positioning buckets of a lower strand of the first endless bucket conveyor are adapted to receive the living animals from a position above the lower strand, wherein the first endless bucket conveyor further comprises retaining means for individually retaining a living animal within a pre-positioning bucket while the living animal is conveyed from a loading zone to a transfer zone, and wherein the living animal falls from an open bottom of pre-positioning bucket into a sorting bucket of an upper strand of the second endless bucket conveyor.

16. The living animal conveying device according to claim 15, wherein the retaining means comprises an endless conveyor mounted between the first upstream return means and the first downstream return means, and wherein the upper strand of the endless conveyor is positioned below and in parallel to the lower strand of the first endless bucket conveyor, and opposite the open lower end of the pre-positioning buckets of the lower strand, and wherein the upper strand of the endless conveyor advances substantially in synchronism with the lower strand of the first endless bucket conveyor.

17. The living animal conveying device according to claim 14, wherein the living animals comprise chicks, and wherein the chicks are positioned with their wings spread out at least while the chicks are falling from the pre-positioning buckets into the sorting buckets, and while the chicks are individually positioned within the sorting buckets.

18. An automatic chicks sexing system comprising a conveying device according claim 17, wherein the automatic chicks sexing system further comprises image acquisition means for obtaining a photograph of at least one of the wings of each chick present in a sorting bucket for imaging processing to determine the sex thereof.

19. The automatic sexing system for chicks according to claim 18, wherein each sorting bucket of at least some of the plurality of sorting buckets comprises an ejection means for ejecting the chick towards one of a plurality of recovery assemblies based on a result of the image processing, the plurality of recovery assemblies being positioned downstream from the image acquisition means.

20. The automatic sexing system for chicks according to claim 19, wherein the ejection means comprises a trapdoor and an opening/closing assembly for the trapdoor positioned on the sorting buckets, and wherein the second endless bucket conveyor further comprises activating means for activating the ejection means such that an ejection of the chick from the sorting bucket is accomplished through the trapdoor onto one of a plurality recovery assemblies.

* * * * *